July 28, 1936. D. J. CAMPBELL Re. 20,043

METHOD OF MAKING BRAKE DRUMS

Original Filed June 15, 1931

Inventor
Donald J. Campbell
By Livermore and
Van Antwerp
Attorneys

Reissued July 28, 1936 Re. 20,043

UNITED STATES PATENT OFFICE 20,043

METHOD OF MAKING BRAKE DRUMS

Donald J. Campbell, Spring Lake Township, Ottawa County, Mich., assignor to Campbell, Wyant & Cannon Foundry Company, Muskegon Heights, Mich., a corporation of Michigan Original No. 2,035,142, dated March 24, 1936, Serial No. 544,350, June 15, 1931. Application for reissue May 16, 1936, Serial No. 80,050

4 Claims. (Cl. 29—152.2)

This invention relates to a method of manufacturing composite drums, the invention being particularly useful in connection with brake drums which are used with automobiles, though useful in other relations.

I have heretofore filed an application for a patent, Serial No. 512,792, on February 2, 1931, wherein an intimate and in effect an integral joinder of a cast iron band of the inner side of an outer cylindrical band or drum of metal which may be pressed, rolled or otherwise preformed into shape is disclosed, and the process essentially consists in the projection of molten cast iron at a very high degree of temperature, approximating 2800° F., against the inner curved side of the preformed band or drum which is rotated and likewise is heated to a high temperature but less than the molten cast iron, the temperature of the drum being approximately 1400° F. This results in a substantial fusing of the inner surface portion of the outer drum member with the cast iron.

The apparatus which is disclosed in said pending application for patent, and the process which is followed out thereby is a very practical one, but I have improved the same, particularly in the matter of rapidity of production with resultant economy and with the elimination of certain parts of the mechanism and apparatus therein shown which previously has resulted in slowing and curtailing the quantity and raising expense of production.

With the present invention it is designed that the outer drum bands of formed metal shall be of double width, and that the cast iron shall be projected thereagainst the drum, heated to a high degree of temperature and revolving as described in my pending application, and at each outer edge of the drum outer member it is provided with an inturned annular lip which serves as a dam for the molten metal, keeping it from running outwardly and obviating the necessity of furnishing a damming element to retain the molten cast iron as is illustrated in the pending application and as is necessary when the molten metal is applied to a single brake drum element.

The present invention permits the application of the cast iron wearing band at the inner side of the preformed outer drum member of double width more quickly and more rapidly than the single width of drum illustrated and described in the pending application referred to, whereby there is an enhancement of quantity production, it being necessary merely after the composite structure has cooled to cut the same circumferentially midway between the sides to produce two complete composite brake drum bands, the dividing or cutting operation being one which is simply and easily performed.

Of secondary importance to the speeding up of production is the obtaining of a set of absolutely matched drums. The inner surface of the drum before the cast metal has been applied thereto is of identical diameter entirely along its length as it is integrally and simultaneously formed and hence the above construction necessarily follows; similarly, after the cast metal has been added, the same condition obtains; and, finally, after the finishing cut, if such cut is desired, the double unit, as yet undivided, is equal as regards all of its several diameters. Thus, a perfectly balanced pair of brake drums is produced by my unique process or method.

An understanding of the invention may be had from the following description, taken in connection with the accompanying drawing, in which, Fig. 1 is a side elevation and section illustrating the manner in which the molten cast metal is projected and deposited against the revolved double width drum band.

Like reference characters refer to like parts in the different figures of the drawing.

Figure 1:
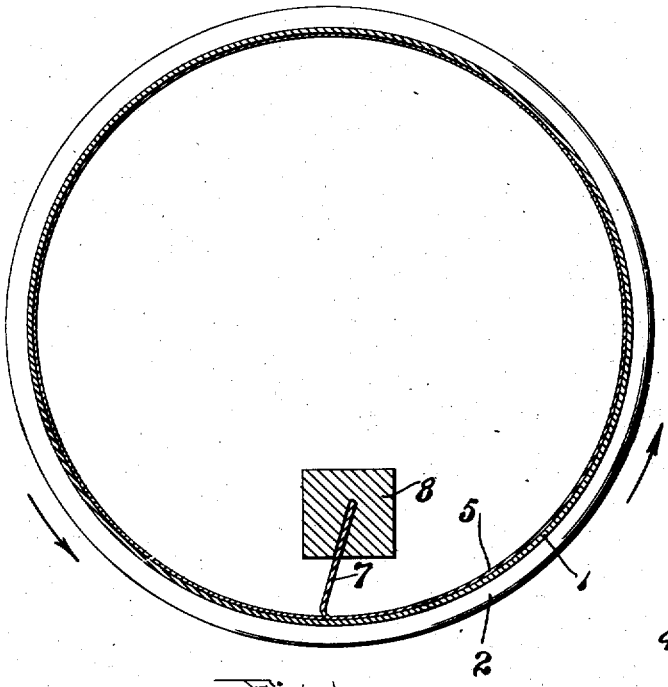
Figure 2:
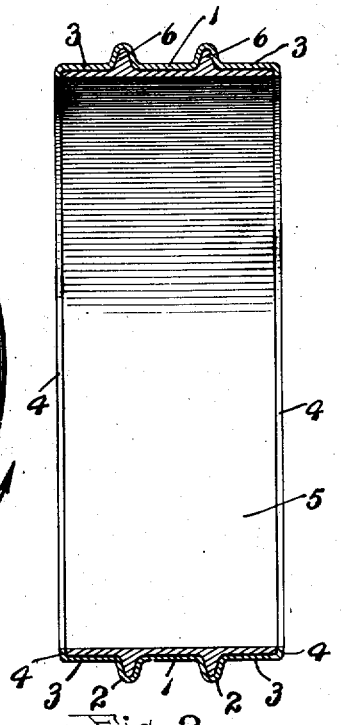
Fig. 2 is a vertical section through the composite double width drum band after the cast metal has been applied thereto.

The first step in the process of manufacturing the composite drum is to form a continuous annular outer member of flat metal of quality such that it can be readily rolled or pressed. This outer member 1 at spaced apart points is formed with outwardly projecting annular ribs 2, sections 3 extending outwardly from the ribs in the same plane with the middle portion 1 between said ribs, and each of the sections 3 at its outer edge is turned inwardly for a short distance, providing a continuous annular flange 4 which is disposed at an angle slightly greater than a right angle to the adjacent sections 3.

This outer member is subjected to heat to raise its temperature and is rotated rapidly about its axis the same as described in my pending application referred to. Molten cast metal is projected against the inner face of the outer member thereby providing a continuous inner lining band 5 with integral ribs 6 extending therefrom into the pressed or rolled ribs 2 in the outer member. The molten metal is shown at 7 as projected by gravity downwardly and in a direction slightly opposite to the rotation of the drum, the rotation of which is indicated by the arrows, the metal coming from a fixed ladle or other receptacle, indicated at 8, all of which is fully described and set forth in my prior pending application for patent.

One feature of the invention resides in the utilization of the inturned annular lips 4 to serve as dams to retain the molten cast metal. It is evident that these lips serve such purpose and furthermore, due to my method of manufacture, only two lips are needed for each double width drum. With the form of outer drum band construction described it has inherently the necessary features which will maintain only the desired quantity of molten metal in place and outward lateral flow of the excess of molten metal will be caused.

Figure 3:
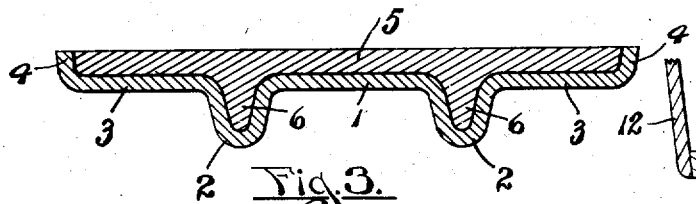
Fig. 3 is an enlarged transverse section through one side of the composite drum band.
Figure 4:
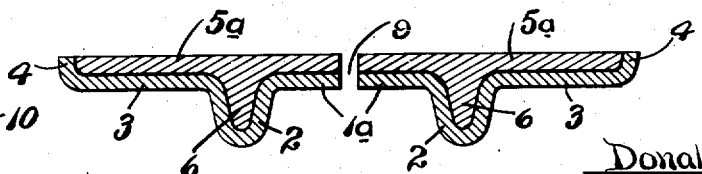
Fig. 4 illustrates the structure in Fig. 3 after a circumferential division thereof in two parts.
Figure 5:
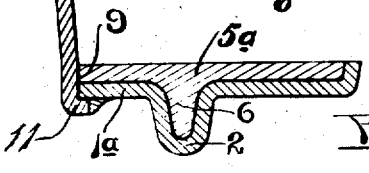
Fig. 5 is a fragmentary section showing the manner in which each of the drum parts shown in Fig. 4 may be welded to a brake drum back or web.

After the double width composite band structure has been produced in the manner described it is split or divided midway between its opposed edges, as at 9 in Fig. 4, cutting the composite structure shown in Fig. 3 into two identical drum flange members each of which has a part 1a which is substantially one-half of the other part 1 between the ribs 2, and a lining 5a which is one-half of the double width lining 5 shown in Fig. 3. The brake drum may be completed by welding a web or back 10 to the cut edges 9 as clearly shown in Fig. 5. The web or back 10 has a flange 11 extending back of the part 1a whereby a good joint is obtained between the several parts.

Figure 6:
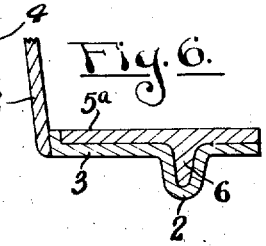
Fig. 6 is a fragmentary section showing the manner in which each of the drum parts shown in Fig. 4 may have a brake drum back or web welded to the continuous annular flange.

Or, if desired, a web or back 12 may be welded to the outer side of the annular rib 4 as shown in Fig. 6.

As stated above the invention is one of great merit resulting in simplification of the process, elimination of troublesome complications in apparatus and mechanism used for carrying out the process and further resulting in large quantity production at a minimum of cost.

The invention is defined in the appended claims and is to be considered comprehensive of all forms of structure coming within their scope.

I claim:

1. The process of manufacturing two brake drums which consists in providing a cylindrical shell having an inwardly extending flange at each end thereof, inserting a lining band interiorly of the shell, cutting the shell and band midway between their ends and attaching webs to each of said flanges.

2. The process of manufacturing two brake drums which consists in providing a rotating cylindrical shell having an inwardly extending flange of predetermined height at each end thereof, feeding a quantity of molten metal interiorly of said shell while the same is rotating, whereby the molten metal levels off between the flanges, permitting the metal to cool, cutting the shell and its lining intermediate its ends, and finishing the inner peripheral face of the metal of each drum provided by said cutting.

3. The process of forming a pair of brake drums, which consists in providing a heated cylindrical body having an inturned flange at each of its ends, said ends being unobstructed, inserting fluid metal of different composition through one of said unobstructed ends against the inner surface of said body, rotating the body and permitting the metal to cool while subjected to centrifugal action and then separating the body and metal substantially midway of its length.

4. The process of manufacturing brake drums which consists, in providing a cylindrical shell having an inwardly extending annular flange at each end thereof, rotating said shell about its axis, depositing molten metal in the annular trough provided by said shell and flanges, said flanges retaining the molten metal against escape to thereby provide a centrifugally cast metal lining to said shell, and attaching a brake drum web to a flange.

DONALD J. CAMPBELL.